(No Model.)
H. W. KING.
HORSE TAIL HOLDER.
No. 269,063. Patented Dec. 12, 1882.
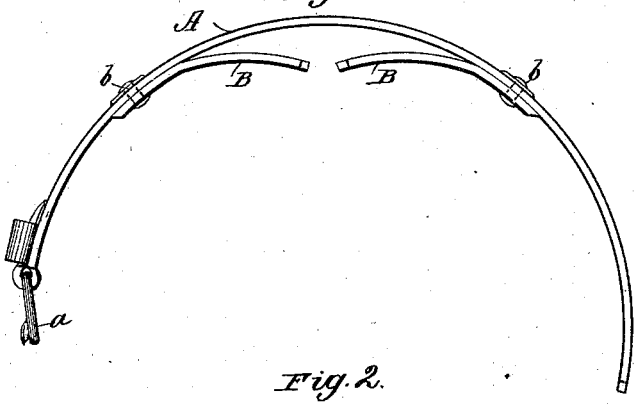
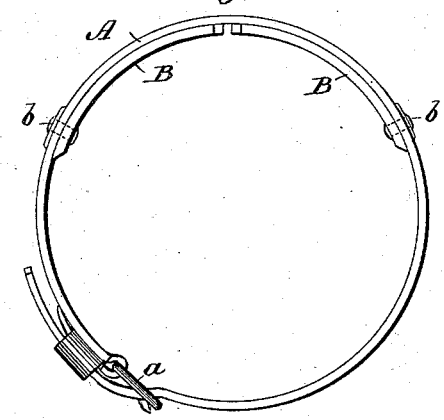
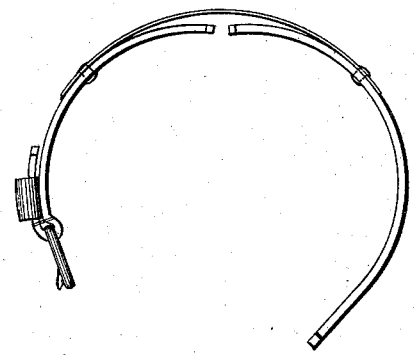
WITNESSES:
H. B. Brown
Edw. W. Byrn.
INVENTOR:
H. W. King
BY
ATTORNEYS.

UNITED STATES PATENT OFFICE.

HENRY W. KING, OF CANAAN, NEW YORK.

HORSE-TAIL HOLDER.

SPECIFICATION forming part of Letters Patent No. 269,063, dated December 12, 1882.

Application filed October 12, 1882. (No model.)

*To all whom it may concern:*

Be it known that I, HENRY W. KING, of Canaan, in the county of Columbia and State of New York, have invented a new and Improved Horse-Tail Holder; and I do hereby declare that the following is a full, clear, and exact description of the same, reference being had to the accompanying drawings, forming part of this specification, in which—

Figure 1 is an edge view of the tail-holder opened. Fig. 2 is a similar view of the same when closed or clamped upon the horse's tail; and Fig. 3 is a view similar to Fig. 1, showing a modification of the invention.

The object of my invention is to provide a simple and effective device for holding a horse's tail after it is plaited or folded up.

It consists of a short strap having a buckle at one end and perforated at the other, and having its middle portion double or made of two thicknesses, with the inner thickness formed with two free and projecting ends extending toward each other, which, when the strap is fastened at its ends, enter the hairs of the tail and pinch the same so as to prevent the said strap from ever slipping off.

In the drawings, A represents the strap, which is made of leather, rubber, or other suitable material, and has at one end a buckle, $a$, and at the other a row of perforations adapted to fasten to the buckle. The middle portion of the strap is made double by the leather flap-pieces B B, which at one end are fastened to the inside of strap by rivets $b$, and at their other ends are disconnected from each other and also from the main strap and project toward each other.

In applying my device the strap is opened, as shown in Fig. 1, and the horse's tail having been plaited and folded up, the strap is applied thereto and the free ends of the pieces B B allowed to bury themselves partially in the hair of the tail. The strap being then tightly bound around the tail and fastened by the buckle, the hair that is caught between the free ends of the pieces B B and the main portion A is bound or pinched between the same as between the jaws of a pair of pinchers, and a firm adherence of the strap to the tail is secured, which effectually prevents the strap from being switched off.

As a modification of my invention, I may sever the main body portion of the strap near its middle and connect the two severed ends by a splice section of metal or leather, as shown in Fig. 3, to produce substantially the same device and the same effect.

Instead of a buckle for fastening the ends of the strap together, any other suitable fastening may be employed.

I am aware that a horse-tail holder has been constructed in the form of a strap with two inwardly-projecting tines or prongs that pass entirely through the tail, and I do not claim any such arrangement, the inwardly-projecting pieces in my case being in the nature of flexible flaps, which involve no injury to the stump of the horse's tail nor to his rump from the switching of his tail, and yet firmly hold the strap in place by a pinching action.

Having thus described my invention, what I claim as new is—

1. A horse-tail holder consisting of a strap with free inwardly-projecting or pinching jaws, substantially as described.

2. A horse-tail holder consisting of a strap with a fastening for its ends, having its middle portion made double, with free inwardly-projecting or pinching jaws B B, substantially as and for the purpose described.

3. A horse-tail holder consisting of a strap, A, with a buckle for a fastening, and the pieces B B, riveted to the inside thereof, and having free ends projecting toward each other in the middle, as described.

HENRY W. KING.

Witnesses:
AMBROSE L. ABRIEL,
EMELINE E. BATES.